W. S. COFFMAN.
Horse Hay Fork.

No. 79,106.

Patented June. 23, 1868.

Witnesses:
Isaac S. Toll
Calvin Marble

Inventor:
William S. Coffman

United States Patent Office.

WILLIAM S. COFFMAN, OF COLDWATER, MICHIGAN.

Letters Patent No. 79,106, dated June 23, 1868.

IMPROVEMENT IN HORSE HAY-FORKS.

The Schedule referred to in these Letters Patent and making part of the same.

TO ALL WHOM IT MAY CONCERN:

Be it known that I, WILLIAM S. COFFMAN, of Coldwater, in the county of Branch, in the State of Michigan, have invented a new and improved Hay-Fork, which I denominate the Excelsior Fork; and I do hereby declare that the following is a full and exact description thereof, reference being had to the accompanying drawings, and to the letters of reference marked thereon.

The nature of my invention consists in combining, with the frame and fork of a horse hay-fork that are hinged together, a bolt on one controlled by a spherical rubber spring, and a catch or keeper on the other, so that they can be locked together, and tripped or unlocked as occasion may require.

In the drawings—

Figure 1:
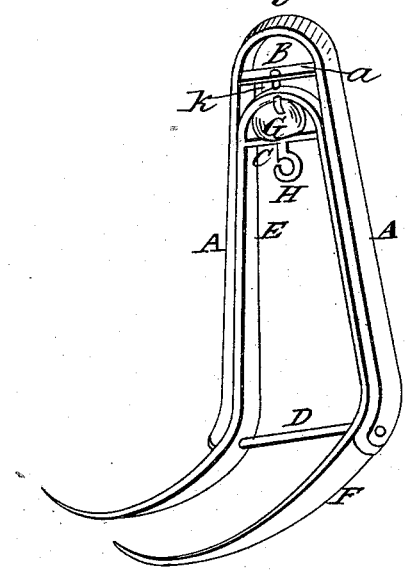
Figure 1 is a perspective view of my apparatus, in which the fork is shown as secured to the standard, or in position to be loaded, or when loaded and ready for being hoisted with its burden.
Figure 2:
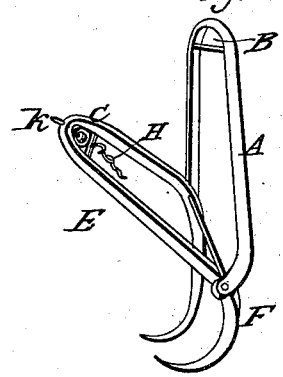
Figure 2 represents the fork as being released from its seat, and in its position while being unloaded.

In fig. 1, A represents the standard or framework of my invention, in the top of which a transverse piece, B, is secured, having a recess, $a$, into which the perpendicular bolt $k$, fig. 2, of the spring G plays. D represents the cross-bar or rod, at the base of the framework, which serves as a rest for the foot, by which the prongs of the fork are pressed into the mass of hay or straw to be elevated. E represents the sides or upper portion of the fork, and F the prongs or tines. G denotes the spherical elastic spring, made of India rubber, and furnished with a bolt, $k$, fig. 2, an eye, H, forming the lower portion of the bolt, and is placed underneath the spring. Into this eye a cord is fastened, by which the spring is operated that is to loosen the bolt from or secure it to the standard A. The spherical India-rubber spring G is seated upon a cross-plate, $c$, in the top of the fork.

The fork in its normal position, or when it is fastened to the standard A, as shown in fig. 1, is ready to be thrust into the hay, the foot of the operator being pressed upon the cross-rod D. When the apparatus has been loaded and hoisted, and it is desired to unload it, the operator, by pulling a cord attached to the eye H, withdraws the bolt from its seat, and thus releases the fork, the weight of the hay bringing it down so quickly that the load is at once disengaged from the prongs of the fork. The operator then pulls the fork back to its seat in the standard A, when the apparatus is ready for renewed operation.

It may be observed that my invention is simple in its parts, economical of construction, possessed of great strength and solidity, (the material employed being altogether metallic,) and not liable to get out of order, the last quality so desirable in a utensil of necessity many times used by unskilled hands, in emergency of weather, when all the disposable force on the farm is employed.

The advantage of a spherical India-rubber spring over coiled or other metallic springs is, that it leaves no space for the hay to enter and clog its action. Besides, it is cheap, efficient, and easily renewed.

Having thus fully described my invention, what I claim therein as new, and desire to secure by Letters Patent, is—

In combination with the two parts, A E, of the horse hay-fork, hinged together as shown, the spherical rubber spring G and bolt $k$ upon one part, and the keeper or recess $a$ on the other part, the two acting together, substantially as and for the purpose described.

WILLIAM S. COFFMAN.

Witnesses:
ISAAC DE GRAFF TOLL,
THOMAS W. BUCK.